United States Patent
Berstis

(12) 
(10) Patent No.: US 6,204,754 B1
(45) Date of Patent: Mar. 20, 2001

(54) PROXIMITY INDICATING SYSTEM

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,297

(22) Filed: Jun. 17, 1999

(51) Int. Cl.[7] .................................................. B60Q 1/00
(52) U.S. Cl. ............................ 340/435; 340/903; 701/96
(58) Field of Search ................................ 340/435, 436, 340/903, 942, 901, 904; 180/167, 168, 169, 170; 367/909, 112, 96, 97, 107; 701/302, 301, 96

(56) References Cited

U.S. PATENT DOCUMENTS

| | | | |
|---|---|---|---|
| 4,240,152 | 12/1980 | Duncan et al. | 367/108 |
| 4,278,962 | 7/1981 | Lin | 340/34 |
| 4,357,085 | * 11/1982 | Niwa et al. | 350/423 |
| 4,383,238 | * 5/1983 | Endo | 340/32 |
| 4,450,430 | 5/1984 | Barishpolsky et al. | 340/904 |
| 4,626,850 | 12/1986 | Chey | 340/903 |
| 4,903,004 | 2/1990 | Starke et al. | 340/425.5 |
| 5,039,217 | * 8/1991 | Maekawa et al. | 340/942 |
| 5,574,426 | * 11/1996 | Shisgal et al. | 340/435 |
| 5,754,099 | * 5/1998 | Nishimura et al. | 340/435 |

* cited by examiner

*Primary Examiner*—Jeffery Hofsass
*Assistant Examiner*—Daniel Previl
(74) *Attorney, Agent, or Firm*—Robert V. Wilder; David A. Mims, Jr.

(57) ABSTRACT

A method and implementing system is provided in which light beams are projected from a first object upon a second object, and the relationship of the images projected upon the second object is used to provide an indication of the distance between the two objects. In an example, two light beams are projected at a predetermined angle of convergence from a vehicle such that the beams intersect between the vehicle and an object located in the path in which the vehicle is moving, for example, behind the vehicle. The intersection of the beams is selectively adjustable by adjusting the angle of convergence of the projected beams to provide an indication when the vehicle has backed to a position which has been determined to be a safe distance from the object.

27 Claims, 5 Drawing Sheets

PROXIMITY INDICATING SYSTEM

FIELD OF THE INVENTION

The present invention relates generally to proximity detection devices and more particularly to a methodology and implementation for providing a visually perceptible indication of a distance between two objects.

BACKGROUND OF THE INVENTION

In many different industries and applications there is a need to be able to move two objects as close as possible to each other without having actual contact between the objects. This need is especially challenging as more and more automobile drivers attempt to park their automobiles in the ubiquitous parking garage. Typically, there is a cement wall at one end of a parking space and a driver must attempt to get as close as possible to the cement wall without bumping into the wall. Many times a driver will think he is close to the wall but when the driver gets out of the vehicle to check, the driver observes that the vehicle still has several more feet of space available to use. In that case, usually the back end of the vehicle is protruding into a driveway in an unsafe position and the driver must return to the vehicle and attempt to move closer to the wall without a collision. This is an even more challenging task when parking sports utility vehicles or vans. Further, many times the driver is attempting to park his vehicle in the early morning hours, or late at night, when the driver's reflexes are not as sharp as they could be.

The parking problem also applies to larger vehicles such as airplanes and fork-lifts, and to businesses such as valet parking garages where the valet parking attendant is sometimes quite rushed in his or her attempt to quickly park one vehicle in a designated space so that the next vehicle may be parked as soon as possible. If the vehicle owners had their cars equipped with proximity detection devices which could be easily used by both the owner and others who may drive the vehicle, the chances of having front-end or rear-end collisions with the fences or walls of a parking facility would be greatly reduced.

In the past, audio systems have been marketed to address this problem. However, such systems are relatively expensive and difficult to interpret for many users. Some audio systems emit short "beeps" or other sounds, and as a vehicle moves closer to an object, the frequency of the beeps increases to warn the operator of the vehicle. These systems, in addition to the introduction of even more noise, are designed to provide a warning to an operator of a vehicle only that there is an object in the rear of the vehicle and are not sufficiently accurate for most parking applications since it is difficult for most people to translate a frequency of audio tones into a distance in terms of feet and even inches.

Thus there is a need for an improved methodology and implementing system which is inexpensive and useful in aiding the operator of vehicle to ascertain the distance between the vehicle being driven and walls and other large objects in proximity to the vehicle.

SUMMARY OF THE INVENTION

A method and implementing system is provided in which at least two light beams are projected from one object, at adjustable angles of convergence, to create two corresponding projected images upon another object. As the two objects are moved relative to each other, the projected images also move relative to each other and when the projected images coincide, the objects are at a predetermined distance from each other. In an exemplary embodiment, a diffraction grating is used to cause each projected image to be in the form of a single line of light such that when two projected lines of light are co-incident, a safe distance has been achieved between the two objects.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
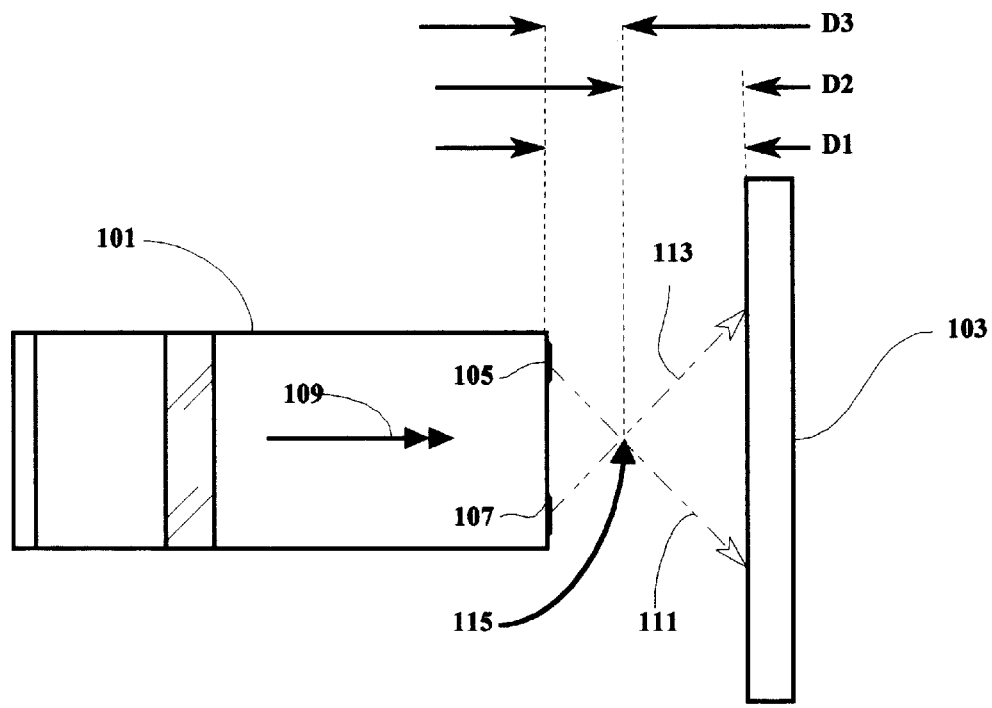
FIG. 1 is an illustration of the operation of the present invention showing a vehicle moving toward a stationary barrier.

In an illustrated exemplary embodiment of the present invention, two narrow beams of light are emitted from the two sides of a vehicle. These beams can be planer, for example, in the shape of a fan, such that when they intersect with a surface, a line image is presented. The beams may also be projected in other shapes also. The light system implemented may be a separate system or part of the back-up lighting system for vehicles in which the narrow beams are activated when the vehicle is shifted into reverse gear. The light beams are projected from the vehicle at an angle of 45 degrees or other angle depending upon how close the vehicle operator wishes to approach a parking garage wall or other barrier behind the vehicle before coming to a stop. When the light images which are projected upon a back wall converge, to a single image or line in the present example, the vehicle will be at a predetermined distance to which had been previously set by the operator by a manual or remote adjustment of the projection angles.

The beams may use laser pointer technology such as adjustable focus visible laser diode modules available from NVG, Inc., through "www.digikey.com" on the World Wide Web. The beams may also be implemented using a diffraction. grating other means to make light beams into vertical stripes which are projected upon objects to the rear of the vehicle. Thus, if one is backing up to a post-and-rail fence, the projected stripes would be visible on some part of the posts or rails, and may be observed by a vehicle operator through a rear view mirror. If necessary, other mirror or viewing devices may be implemented along the roof line or elsewhere on the vehicle to aid an operator in viewing the light patterns or images projected onto objects behind the vehicle. In this manner, even light projected onto objects below the trunk line may be viewed by an operator to enable the operator to make a distance determination as to when the vehicle is at a given distance away from such objects. The beams from each side of the vehicle may optionally be of different colors to further aid the operator to determine the distance from the vehicle to objects behind the vehicle. Different colors would help when the intersection is farther from the vehicle and the operator would know that when a certain color is on the left, for example, the vehicle is too close to an illuminated object behind the vehicle. Further, if the projected light lines in one example move farther apart as the vehicle backs-up, that is another indication that the vehicle is too close. These factors are accounted for in initially establishing the converging angle of projection for the light beams which, in turn, establishes a distance between the vehicle and a position at which the projected beams intersect each other. The system herein described can also be implemented on the front of a vehicle and used to indicate the distance from the front of a vehicle to a wall or fence or other object in front of the vehicle to help avoid inadvertent collisions. Further, the light beams may be focussed at the intersection of the beams such that the beams will not be especially bright or distracting to other vehicles in the area.

To customize the predetermined "safe" distance or position at which the projected beams intersect, one of the lights may be rotated by a measured amount by a small stepping motor, worm drive or other mechanical or electromechanical device so that the intersection of the two beams can be moved closer or farther from the vehicle. The setting angle for the intersection of the beams may also be customized to each of several operators depending upon the distance at which each operator may feel most safe. This can be implemented together with other driver-customized features in a vehicle such as customized automatic seat adjustments for different operators which can be implemented through a simple switch or with a so called operator "smart card" which is effective to set a variety of customized features for different operators of a vehicle.

The distance indication system disclosed herein may also be implemented for airplanes, fork-lifts and other applications. Also, the distance indicating system may be coupled with an alarm system to provide an automatic alarm. Moreover, the present invention may also include a feedback feature to automatically control the movement of an object or vehicle.

To illustrate an exemplary operation of the present invention, there is shown in FIG. 1, a top view of a vehicle 101, such as a sports utility vehicle or automobile, which is backing-up 109 toward a wall or barrier 103. In the example, the operator of the vehicle is able to view the surface of the wall 103 through a rear-view mirror in the vehicle 101. When the vehicle 101 begins to back-up 109, for example, into a garage parking space which terminates at the wall 103, the vehicle is at a distance D1 from the wall 103. The distance indicating system of the present invention includes a light projecting system which is mounted on the rear end of the vehicle 101. In the example, the light projecting system is effective for projecting first and second light beams 111 and 113 from corresponding first and second light projectors 105 and 107, respectively. As illustrated, the first beam 111 intersects with the second beam 113 at an intersection position 115 which is adjusted to be at a predetermined distance D3 from the rear end of the vehicle 101. The beams may be adjusted to intersect at a position closer to the vehicle or at a position farther away from the vehicle 101 depending upon what an operator may consider to be a safe distance. The specific hardware used to enable the movement of the beams 111 and 113 may be any of many systems that are considered to be well known in the art.

Figure 2:
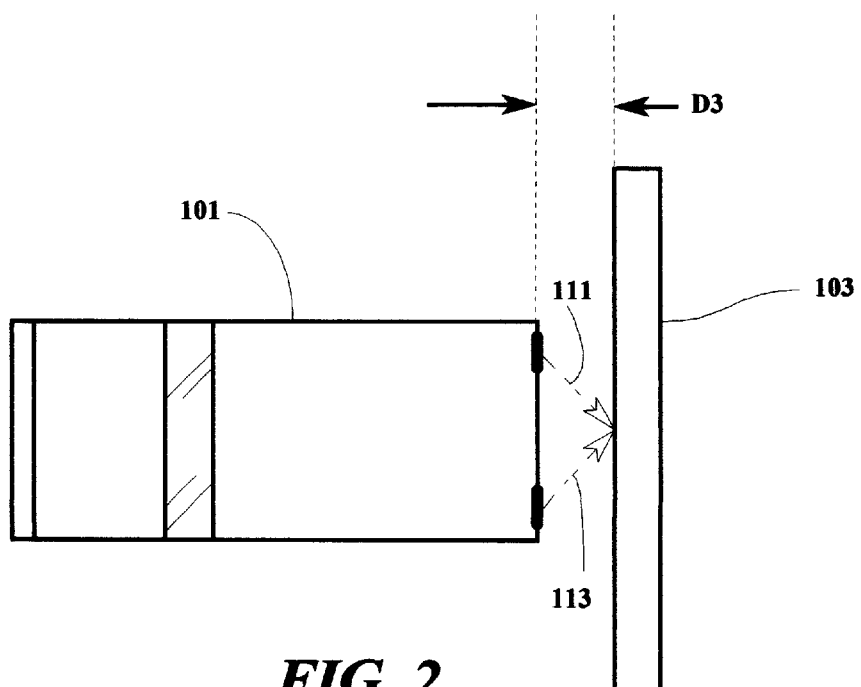
FIG. 2 is another illustration of an operation of the present invention similar to FIG. 1 in which the vehicle is in a position closer to the barrier.

As shown in FIG. 2, the operator of the vehicle 101 will back-up for a distance D2 toward the wall 103 until the distance between the vehicle 101 and the wall 103 is equal to the "safety distance" D3. At that time, the operator will observe the convergence of the light beam projections on the wall 103, either by direct visual perception or through a mirror system, and will stop the vehicle 101 at a predetermined safe distance from the wall 103.

Figure 3:
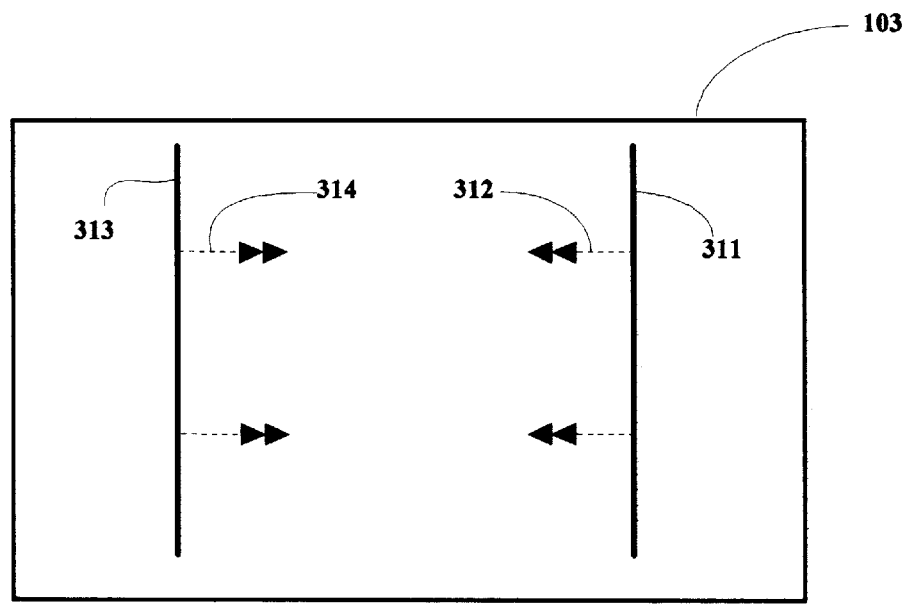
FIG. 3 is an illustration of exemplary images projected from the vehicle to the barrier or wall when the vehicle is in the position illustrated in FIG. 1.
Figure 4:
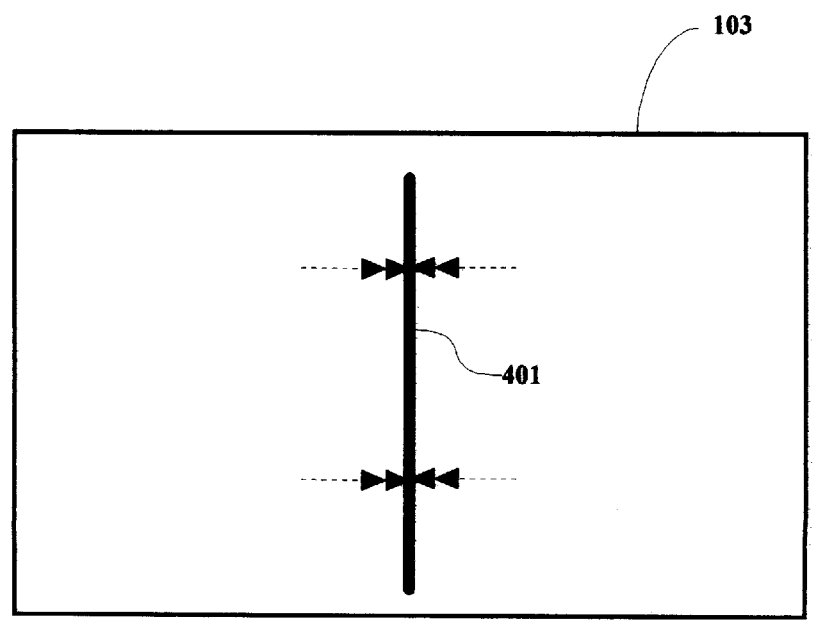
FIG. 4 is an illustration of exemplary images projected from the vehicle to the barrier or wall when the vehicle is in the position illustrated in FIG. 2.

The images projected upon the wall 103 with the light beams 111 and 113 may be of any convenient or desirable form so long as an operator is able to detect a convergence of the projected images on the wall 103. In the example, the projected images are in the form of projected light lines 311 and 313 as shown in FIG. 3. Light line 311 is formed on the wall 103 by light beam 111 and light line 313 is formed on the wall 103 by light beam 113. As vehicle 101 moves toward the wall 103, the projected light lines 111 and 113 move toward each other on the wall 103 as shown by arrows 313 and 314, respectively. When the projected light lines 311 and 313 coincide to form a single line 401 as shown in FIG. 4, the light beams 111 and 113 are intersecting and the vehicle has reached a distance D3 from the wall 103 at which position the vehicle 101 will be stopped.

Figure 5:
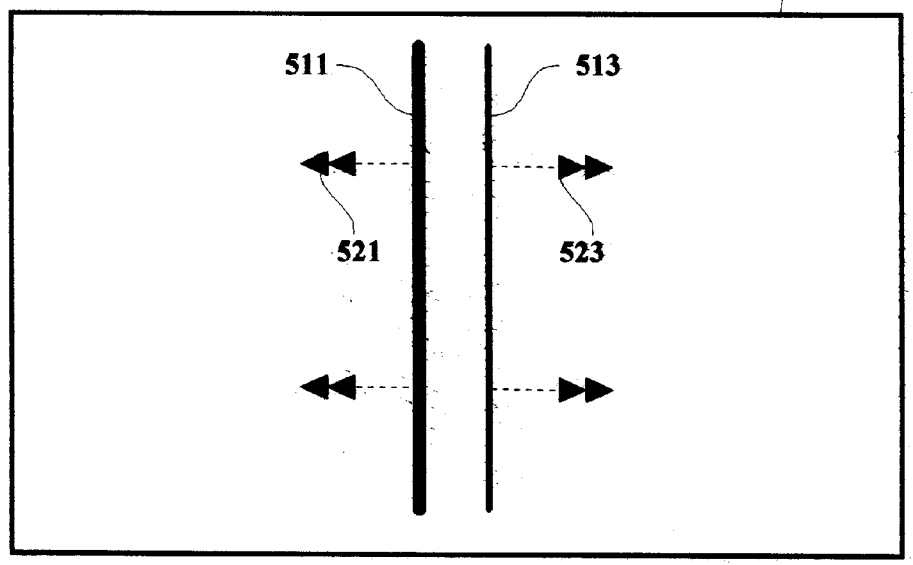
FIG. 5 is an illustration of exemplary images projected from the vehicle to the barrier or wall when the vehicle is moving away from the barrier or wall.

In FIG. 5, the illustration indicates the appearance of projected light lines 511 and 513 moving away from each other 521, 523, as a vehicle continues to move toward a wall 103 after passing through the intersection 115 (FIG. 1) which represents the safe distance D3. The appearance of the lines 511 and 513 moving away from each other will immediately warn the vehicle operator that the vehicle has passed the safety distance and is now too close to the wall 103. To further enhance this visual warning, each of the light projectors 105 and 107 may project a different color light line such as red and green such that when the operator sees a red line on one side of a mid-line rather than the other side, the operator will immediately know to stop. Alternate forms may also be used such as making one of the projected lines thicker than the other as shown in FIG. 5.

Figure 6:
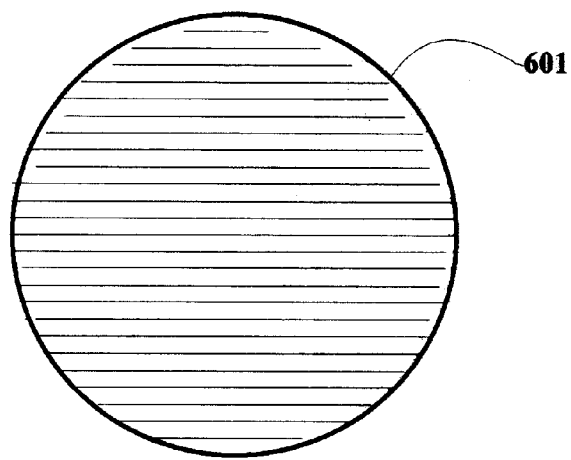
FIG. 6 is an illustration of a diffraction grating which may be used in an implementation of the present invention.

FIG. 6 illustrates a horizontally-oriented diffraction grating which may be placed over a light source to create a vertical line such as line 111 or line 113 on the wall 103. In another embodiment, the diffraction grating may be rotated 90 degrees from the orientation shown in FIG. 6 in order to create horizontal light lines on a wall 103 or other object behind the vehicle 101.

Figure 7:
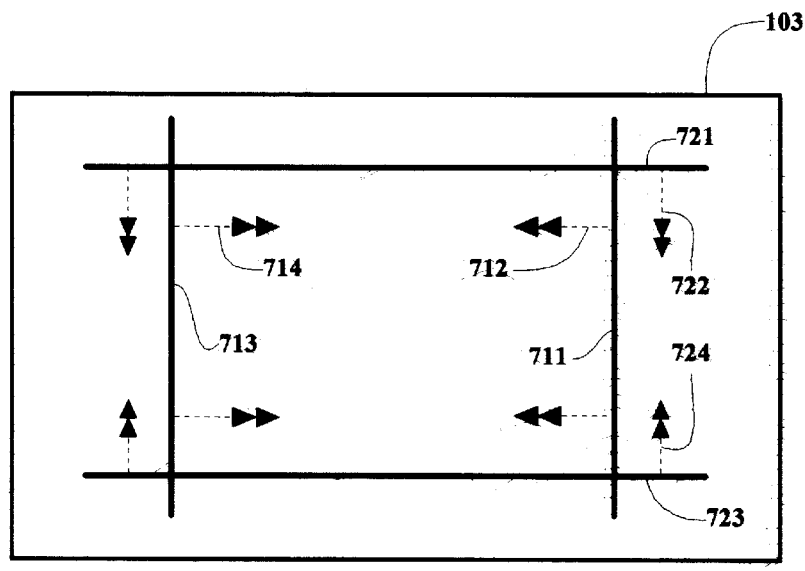
FIG. 7 is an illustration of exemplary images projected from the vehicle to the barrier or wall when the vehicle is equipped with an alternate embodiment of the distance indicating device of the present invention.

In FIG. 7, for example, projected light images are shown for a system which uses two light source projectors on each side of a vehicle, which are diagonally oriented with respect to each other such that they both have a vertical and a horizontal displacement with respect to each other. One of the projectors on each side creating vertically oriented light lines 711 and 713, and the other projector on each side being operable to project horizontally oriented light lines 721 and 723. As the vehicle moves toward a wall 103 in the example, corresponding vertically oriented lines will move toward each other and horizontally oriented light lines will also move toward each other. When the vehicle is at the safety position at a distance D3 from the wall 103, there will be only one vertical line and one horizontal line which will intersect to provide an indication that the vehicle is at a safe distance from the wall 103 and should be stopped. The horizontally oriented light lines would be useful in situations where there are vertical parking posts without any horizontal surfaces upon which to project a vertically oriented light image.

Figure 8:
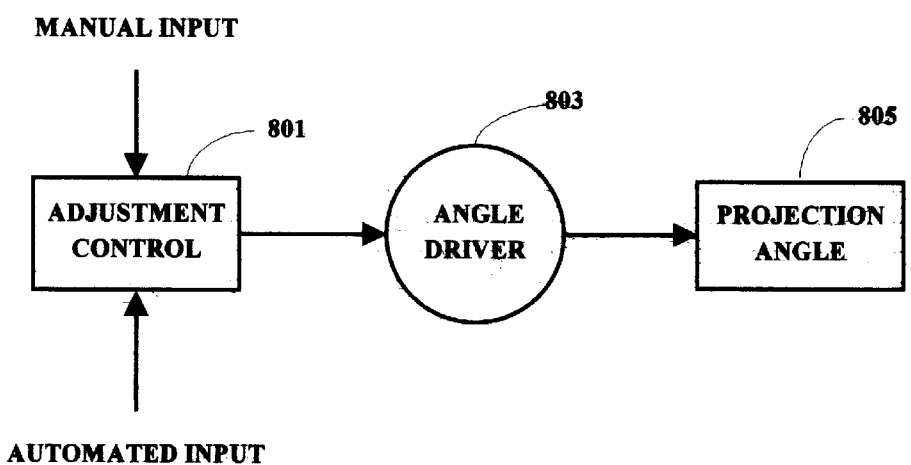
FIG. 8 is a schematic diagram showing automatic and manual methods of control over the angle at which images are projected from the vehicle to the barrier or wall.

In FIG. 8, an adjustment control device 801, which may include either a manual input or an automatic input, is selectively operable upon a driver apparatus 803 to adjust the projection angle 805 of the light beams 111 and 113 upon the surface of an object. As hereinbefore noted, the adjustment control device may be a stepping motor, worm drive or other mechanical or electromechanical device. Further, the automated input may be in response to an operator using a smart card to adjust various adjustable features of a vehicle, including the "safe-distance" adjustment for the distance indicating system of the present invention.

Figure 9:
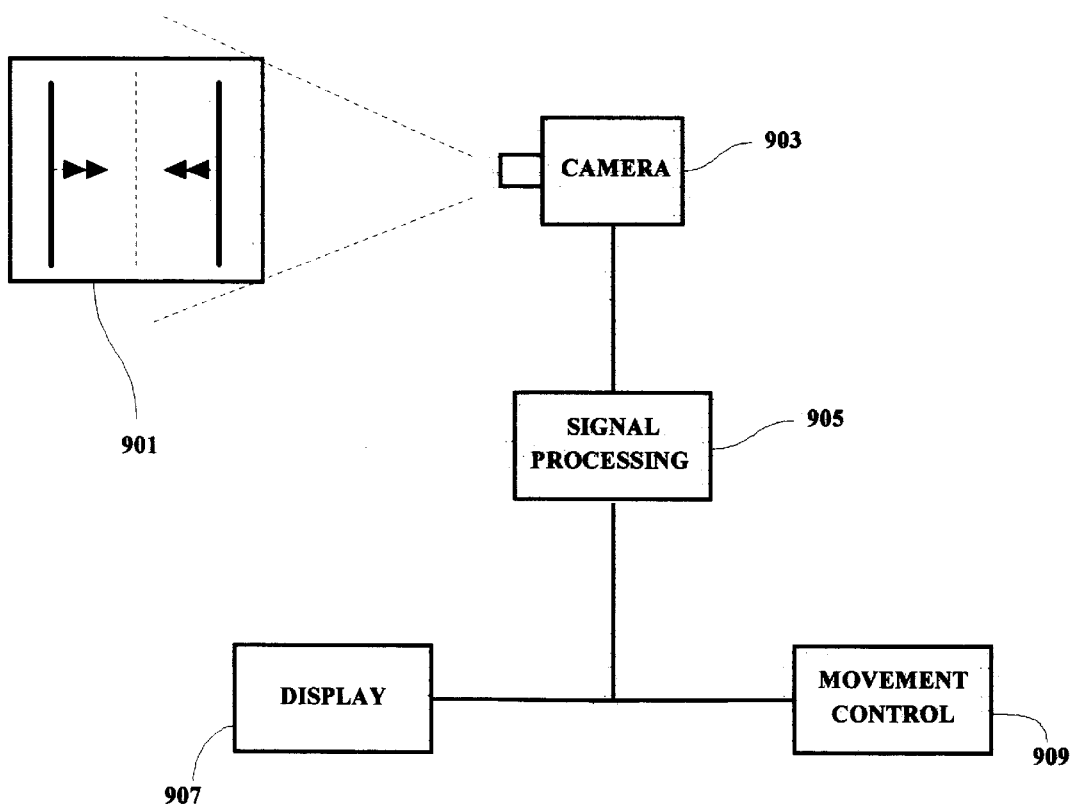
FIG. 9 another embodiment showing a system in which the present invention may be implemented with a feedback feature to provide automatic control of a vehicle in accordance with the present invention.

FIG. 9 illustrates another embodiment of the present invention in which images of the projected light lines are projected upon an object 901. Those images are received by a digital video camera, for example, and the received images are analyzed and processed 905 to determine the distance between the lines, and to provide a signal indicative of the distance between the projected lines. That signal is also representative of the distance between two objects such as a vehicle or first object projecting the light lines and a wall or second object upon which the light lines are projected. The output from the signal processing function 905 may be displayed in some form 907 to a vehicle operator and/or used to control the movement 909 of the first object or vehicle relative to the second object upon which the images are projected.

A system containing the light beam projectors may also be a self-contained, portable and re-usable module which may be temporarily attached to an object or load being moved by remote control. The projected images may be observed or measured remotely, for example by a crane operator moving the load close to a wall or other objects. (This process may also be automated with a feedback feature as hereinbefore explained in connection with FIG. 9.) As the crane operator or remotely controlling mechanism observes the convergence of the projected light lines or other projected images, the operator can terminate the movement of the load. At that time the light projecting distance indicating module may be taken from the first load and placed on the next load to be moved.

The light beam projection distance indicating system described herein may also be implemented and permanently mounted in locations to help insure that certain predetermined distances are maintained between objects being placed near light projecting installation. In these applications, the light projecting devices will not be mounted on a moving object but will rather be installed in a permanent position (for example in a corner of a warehouse) and the light beam images will be projected and observed on moving objects when such objects are moved in proximity to the location of the distance indicating system.

The method and apparatus of the present invention has been described in connection with a preferred embodiment as disclosed herein. The disclosed methodology may be implemented in a wide range of systems to accomplish the desired results as herein illustrated. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for providing an indication of a distance between first and second objects, said method comprising:
    projecting a first light beam from said first object, said first light beam being projected at a first angle relative to a reference axis associated with said first object;
    projecting a second light beam from said first object, said second light beam being projected at a second angle relative to said reference axis;
    adjusting said first and second light beams at predetermined fixed angles relative to said reference axis to provide an intersection of said first and second light beams, said intersection being at a predetermined distance from said first object; and
    using said first and second light beams to provide an indication of distance between said first and second objects.

2. The method as set forth in claim 1 wherein said first and said second angles are equal.

3. The method as set forth in claim 1 wherein said first object is a movable object and said reference axis is a direction of movement of said first object.

4. The method as set forth in claim 1 wherein said indication of distance is provided by detecting relative positions of first and second images on said second object, said first and second images being created by said first and second light beams, respectively.

5. The method as set forth in claim 4 wherein said first and second images comprise first and second lines of light, respectively.

6. The method as set forth in claim 5 wherein said first and second light beams are adjusted such that said first and second lines of light are coincident along a single line on said second object at said predetermined distance from said first object.

7. The method as set forth in claim 6 wherein said first and second light beams are produced by laser light producing devices.

8. The method as set forth in claim 7 wherein said laser light producing devices are laser diode modules.

9. The method as set forth in claim 7 wherein said laser light producing devices include means for adjusting focus of said first and second light beams.

10. The method as set forth in claim 1 wherein said method further includes using said indication of distance to control a relative distance between said first and second objects.

11. The method as set forth in claim 1 wherein said light source comprises first and second light emitting devices.

12. The method as set forth in claim 11 wherein said lens device comprises first and second lens structures placed between said first and second light emitting devices, respectively, and said second object.

13. A method for providing an indication of a distance between first and second objects, said method comprising:
    providing a light source on said first object;

positioning a lens device between said light source and said second object; and projecting first and second light beams through said lens device toward said second object, said first and second light beams being projected at predetermined fixed converging angles relative to a reference axis associated with said first object, said first and second light beams being arranged to intersect at a predetermined distance from said first object.

14. The method as set forth in claim 13 wherein said first and second light beams are effective to create corresponding first and second images to appear on said second object, said method further including:

moving one of said first and second objects; and detecting relative changes between said first and second images in response to said moving, said changes being indicative of corresponding changes in said distance between said first and second objects.

15. The method as set forth in claim 14 and further including providing a distance signal representative of said distance between said first and said second objects.

16. The method as set forth in claim 15 and further including using said distance signal to control movement of said first object.

17. The method as set forth in claim 14 wherein said first and second images appear on said second object as first and second lines of light, respectively.

18. The method as set forth in claim 17 wherein said first and second lines of light are vertically oriented lines of light.

19. The method as set forth in claim 17 wherein said first and second lines of light are horizontally oriented lines of light.

20. The method as set forth in claim 17 wherein said first and second light beams are produced by adjustable focus laser diode modules.

21. The method as set forth in claim 17 wherein said lens device comprises a diffraction grating.

22. The method as set forth in claim 13 and further including selectively adjusting said predetermined converging angles to modify said predetermined distance.

23. A distance indicating system for indicating a distance between first and second objects, said system comprising:

a first light projection device mounted on said first object for projecting a first light beam from said first object, said first light beam being projected at a first angle relative to a reference axis associated with said first object;

a second light projection device mounted on said first object for projecting a second light beam from said first object, said second light beam being projected at a second angle relative to said reference axis;

means for adjusting said first and second light beams at predetermined fixed angles relative to said reference axis to create an intersection of said first and second beams, said intersection being at a predetermined distance from said first object; and means for detecting images projected upon said second object by said first and second light beams.

24. The system as set forth in claim 23 wherein said first and second light beams are effective to project first and second images on said second object, said first and second images being measurably distinct from each other.

25. The system as set forth in claim 24 wherein said first and second images are of comprised of different colors.

26. The system as set forth in claim 25 wherein said first and second light projection divices are laser diode modules.

27. The system as set forth in claim 25 wherein said first and second light projection devices include first and second diffraction grating devices effective to project said first and second images as lines of light.

* * * * *